Nov. 18, 1969 J. OSWALD 3,479,457

METHOD AND APPARATUS FOR THE DEMODULATION OF ELECTRIC WAVES PHASE-SPACE OR FREQUENCY-MODULATED BY HIGH-SPEED CODED SIGNALS

Filed May 7, 1965 5 Sheets-Sheet 1

INVENTOR
JACQUES OSWALD
BY Paul M. Craig, Jr.
ATTORNEY

INVENTOR
JACQUES OSWALD
BY Paul M. Craig, Jr.
ATTORNEY

INVENTOR
JACQUES OSWALD
BY Paul M. Craig, Jr.
ATTORNEY

INVENTOR
JACQUES OSWALD
BY Paul M. Craig Jr.
ATTORNEY

Nov. 18, 1969 J. OSWALD 3,479,457

METHOD AND APPARATUS FOR THE DEMODULATION OF ELECTRIC WAVES PHASE-SPACE OR FREQUENCY-MODULATED BY HIGH-SPEED CODED SIGNALS

Filed May 7, 1965 5 Sheets-Sheet 5

INVENTOR
JACQUES OSWALD
BY Paul M. Craig, Jr.
ATTORNEY

United States Patent Office
3,479,457
Patented Nov. 18, 1969

3,479,457

METHOD AND APPARATUS FOR THE DEMODULATION OF ELECTRIC WAVES PHASE- OR FREQUENCY-MODULATED BY HIGH-SPEED CODED SIGNALS

Jacques Oswald, Versailles, France, assignor to C.I.T.-Compagnie Industrielle des Telecommunication, Paris, France Filed May 7, 1965, Ser. No. 454,048
Claims priority, application France, May 8, 1964, 973,743
Int. Cl. H04l 1/00, 7/08
U.S. Cl. 178—67 17 Claims

ABSTRACT OF THE DISCLOSURE

A demodulator for a carrier wave phase- or frequency-modulated by binary coded signals of constant duration, comprising means for periodically taking polarity samples out of said wave, a main shift register for storing said samples, means for comparing with each other the two elements of pairs of said samples taken at predetermined time intervals and for deriving from their comparison uncorrected demodulated binary signals, and an error correcting device including at least one auxiliary shift register for storing said uncorrected signals, means for comparing in pairs a plurality of latter said signals taken at further predetermined time intervals and means for deriving therefrom corrected demodulated signals.

This invention relates to a new demodulation method and a new class of demodulators for frequency or phase modulated carrier waves, applicable to the case where such waves are modulated by high-speed rhythmically coded intelligence signals, such as telegraph signals, coded data and the like. By "rhythmically coded signals" are to be understood signals of constant duration and spacing, each having one or the other of two possible signalling conditions, or sometimes pairs of such signals appearing simultaneously or successively. Such signals are also commonly called "binary signals" or "bits," and pairs of such signals are often called "dibits." For short, any simple binary signal will be hereinafter designated as an "elementary signal" or even, more simply, a signal, and signal pairs will be designated as such.

The demodulators of the invention are capable of operating at signalling speeds up to several thousands of "bauds," i.e. several thousands of significant signals per second (a significant signal being identical with an elementary signal or a pair of such elementary signals, as the case may be).

A common feature to the demodulators of the invention is that they effect demodulation of a phase or frequency modulated wave by comparing the instantaneous polarities of a plurality of samples taken from said wave at short and regular time intervals, and by deriving from said comparison information relating to phase jumps which may have occurred in said wave during a time interval, the duration of which is close to that of an elementary signal. Another common feature to said demodulators is that they effect demodulation by means of logic circuits exclusively, and, moreover, that they include further logic circuits allowing the errors arising from various causes in the demodulation process to be automatically corrected.

More specifically, the invention has for its object demodulators for the receiving of a carrier wave modulated by coded intelligence signals at a keying speed comparable with the frequency of said carrier wave, according to one of the modulation methods known as bivalent differential phase modulation, quadrivalent differential phase modulation or frequency modulation. It will be seen later on that the possibility of using the system of the invention for the demodulation of frequency modulated waves directly results from its capability of performing such demodulation in the case of waves subjected to bivalent differential phase modulation.

Before explaining the principle of the invention, the following definitions must be reminded:

By "coherent phase modulation" shall be understood a modulation in which the ratio of the duration of an elementary signal to the half-period of the carrier wave is equal to the quotient of two integer numbers, and, in most practical cases, to an integer number.

By "strictly coherent phase modulation" shall be understood a modulation in which a constant relationship is maintained between the carrier wave phase and the beginning and end of any elementary signal.

In accordance with the terminology recommended by the CCITT (International Telephone and Telegraph Committee), the two possible values of a binary coded signal will be conventionally designated as A and Z, for the case of bivalent differential phase modulation. For instance, one may take $A=0$ and $Z=1$, and the occurrence of an A may cause a phase change in the carrier, and that of a Z no change. For convenience, these assumptions will be retained in the following description.

Also in accordance with CCITT terminology, the two elements of a coded signal pair will be conventionally designated as U and V, each of the latter symbols having either of the A and Z values. To each of the four possible permutation combinations of the two possible values of each of said elements, there will correspond a different phase shift of the carrier in the case of quadrivalent differential modulation.

Transmitters and receivers, the operation of which relies on different principles from those involved in the present invention, have been previously known.

For instance, a coherent bivalent differential phase modulation transmitter in which each elementary signal has a constant duration T, there being $k$ half-periods of the carrier in said duration ($k$ being a small integer, for instance $k=3$) may comprise an "AND" gate receiving at one input the logical value of the elementary signal to be transmitted ($A=0$, $Z=1$), at another input short control pulses recurring at intervals of duration T, an "OR" circuit receiving at one input the pulses coming from the output of the "AND" circuit, at another input further control pulses recurring at intervals of duration $T/k$, each of said first-named control pulses appearing in the middle of a $T/k$ interval between two successive of said further control pulses—a bistable flip-flop receiving at its input the pulses coming from the "OR" circuit and delivering at a single output a bipolar rectangular wave which is fed to a transmission line through a low-pass filter. The wave at the output of the flip-flop normally exhibits polarity changes every $T/k$ seconds when no pulse appears at the output of the "AND" gate. Assuming that for the value $A=0$ of the elementary signal to be transmitted, the "AND" gate delivers a pulse every T seconds, there occurs at the flip-flop output an additional polarity change in the middle of a corresponding interval of duration $T/k$. On the contrary, for the value $Z=1$ of the elementary signal there is no additional polarity change. As a result, at the output of the low-pass filter, a coherent modulation wave is sent into the line, this wave undergoing a phase inversion when an A signal is transmitted, and undergoing no inversion when a Z signal is transmitted.

Similarly, it may be seen that a quadrivalent differential coherent phase modulation may be carried out by an arrangement fed by at least two trains of signal pulses and comprising at least three bistable flip-flops and two "AND" gates which each receive on one of their inputs logical values corresponding respectively to those of the two elements of a pair of signals to be simultaneously transmitted.

Considering now the receiving end of a communication link, demodulation techniques are known for bivalent and quadrivalent modulations, in particular the technique described by Doelz, Heald and Martin in the Proceedings of Institute of Radio Engineers, May 1957, pp. 656–661, which is based on the comparison of the voltages delivered by two resonators respectively excited according to the instantaneous polarities of samples picked up from the carrier at two successive instants. A device, the operation of which relies on a similar principle, is also described in the U.S. Patent No. 3,128,343 to P. A. Baker.

More recently, a technique has been described, in the French Patent 1,383,789 and in its additional Patent 84,857, according to which samples are periodically taken from the received wave at time intervals short in comparison with the duration of an elementary signal; thereafter the two elements of each pair of such samples corresponding to instants separated by a time interval equal to said duration are compared for their polarities, and the result of the comparison translated into a binary digit.

However, this latter technique is liable to introduce demodulation errors unless the received wave be strictly phase coherent and reasonably free of disturbances; further, true synchronism must be kept between the clock pulse source which controls the sending of the signals at the transmitting end and that which controls the sampling times at the receiving end of the system. Finally, some of the samplings may yield a zero result and consequently be unable to allow a decision to be made as to the proper value of the corresponding digits.

It is one of the main purposes of the present invention to obviate the just-mentioned drawbacks and to provide methods and devices capable of practically ensuring their complete elimination.

In a similar manner, in the demodulators of the present invention, samples are continuously picked up, under the control of a local clock pulse source, from the received carrier at time intervals relatively small compared with the duration of an elementary signal (for instance, there may be taken ten to twenty samplings per signal) and the value of the signal, or of each element of a signal pair, is established by comparing the polarities of a number of pairs of samples the two elements of each of which are spaced by the duration T of a signal, or by a duration only little different from said duration, these comparisons being carried out at the same rhythm as the samplings, and by submitting at the same said rhythm the binary digits resulting from said comparisons to a series of further comparisons between themselves until a series of consecutive common-values digits is obtained, this being effected by means of logic circuits elaborating said binary digits according to the rules of Boolean algebra.

The demodulators according to the invention are particularly simple and efficient due to the following features:

(1) They can operate satisfactorily on a wave which, although coherently modulated when first transmitted, might have lost, when received, its strict coherence, in particular owing to phase distortion in the line and in the various receiver circuits, resulting into shift of the zeros of the carrier wave with respect to their theoretical time positions.

(2) The clock which governs the rhythm of the samplings and of the comparisons does not need to be accurately synchronized or periodically reset on the clock which defines the recurrence frequency of the modulation processes at the transmitting of the system.

(3) The demodulators of the invention are of the "transparent" type, as defined by the CCITT, i.e. the reference instants corresponding to the beginning and end of each demodulated elementary signal, at the receiving end, are directly obtained in the demodulation process of the received wave.

There is no need to stress the simplification and the equipment saving associated with the demodulators according to the invention as compared to those of the prior art. In return, as a result of the partial loss of phase coherence at the receiving end and of the lack of strict synchronization of the receiving end clock, demodulation faults could not be helped if the invention did not provide means for eliminating these faults. These means are, as will be seen later on, extremely simple in their principle and of cheap construction.

As already mentioned, according to one feature of the invention, in a demodulator for differential phase modulation in which, during an elementary signal of duration T, there are $k$ half-waves of the carrier, $n$ samples on the average are picked up per signal, $n$ being large compared with $k$, at time intervals very little different from $T/n$ but not necessarily absolutely equal to $T/n$, and an instantaneous value of the demodulated signal is derived from comparisons made on samples picked up at different times, these comparisons being carried out at the same rhythm as are picked up the samplings.

Should there be no phase distortion in the received wave and should the receiving end clock be strictly synchronized, one would obtain, for a given value of the transmitted signal, for instance $Z=1$, a uniform sequence of $n$ "1" digits per elementary signal. But owing to the deficiencies mentioned above, one will obtain in fact a sequence containing, per signal, an average of $n$ signals comprising a majority of "1's" but also a few "0's."

According to another feature of the invention, these faults are eliminated by means of a logic circuit which performs comparisons between several successive demodulated digits taken in said sequence, in odd number, and which, through a "majority decision" process, delivers a new digit, the value of which corresponds to that of majority of the elements of the latter said several digits.

The demodulation technique of the invention can be applied not only to near coherent differential phase modulation but also to frequency modulation. This is due to the fact that, for certain values of the parameters, when samples are picked up at regular intervals from a frequency shift modulated wave, an approximate phase coincidence is obtained for a particular signal, for instance Z, and that an approximate phase opposition is obtained for the other signal A. As a result, this type of modulation can also be processed by the demodulating arrangement of the invention.

In order that the invention be clearly understood, the process according to the invention and possible embodiments thereof will now be described in greater detail. The embodiment relating to the bivalent differential phase modulation will be described hereinbelow in I(a), that relating to frequency modulation in I(b) and that relating to quadrivalent differential phase modulation in II.

The description will be made with reference to the accompanying drawings, in which.

Figure 2:
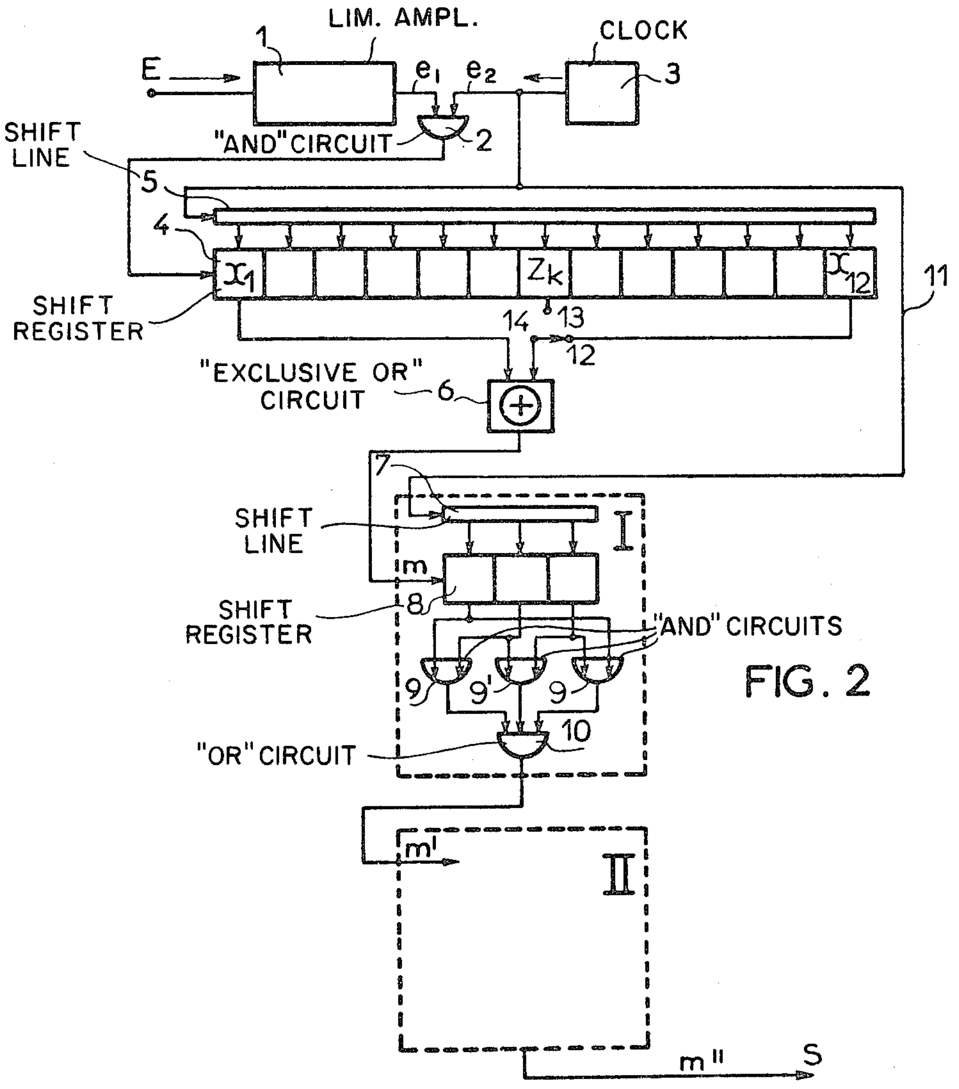
FIGURE 2 shows a typical embodiment of the demodulation process according to the invention in the case of a bivalent phase modulated wave.
Figure 3:
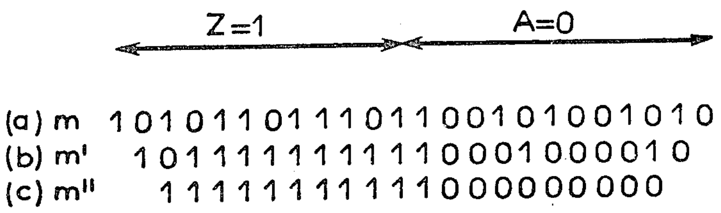
Figure 4:
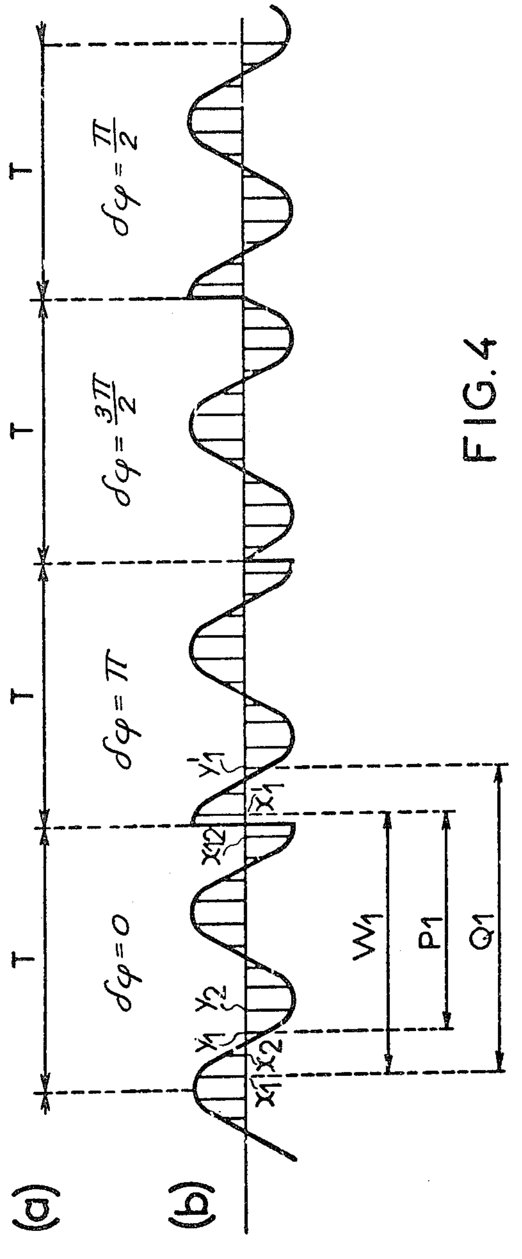
Figure 5:
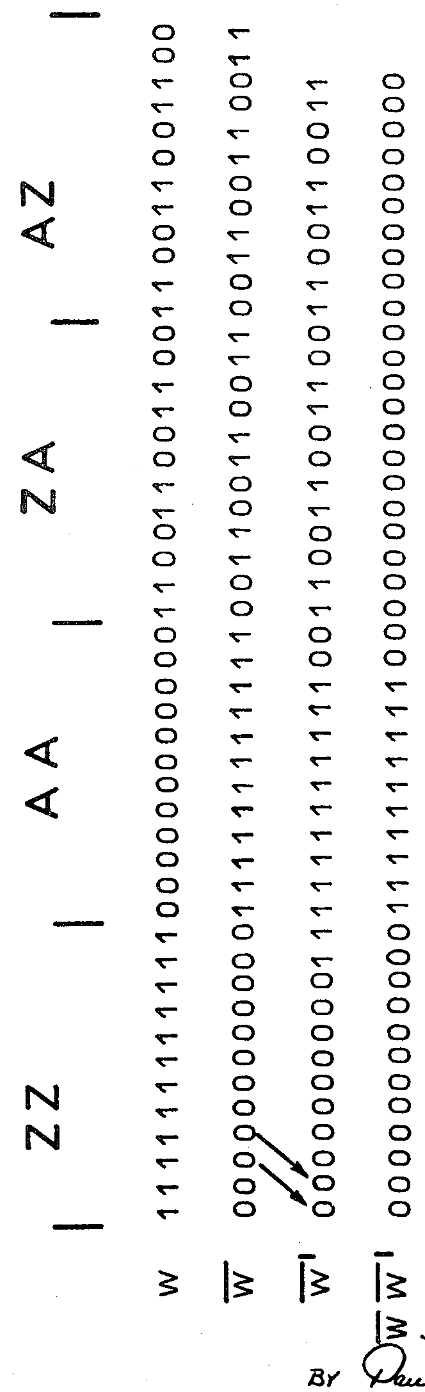
Figure 6:
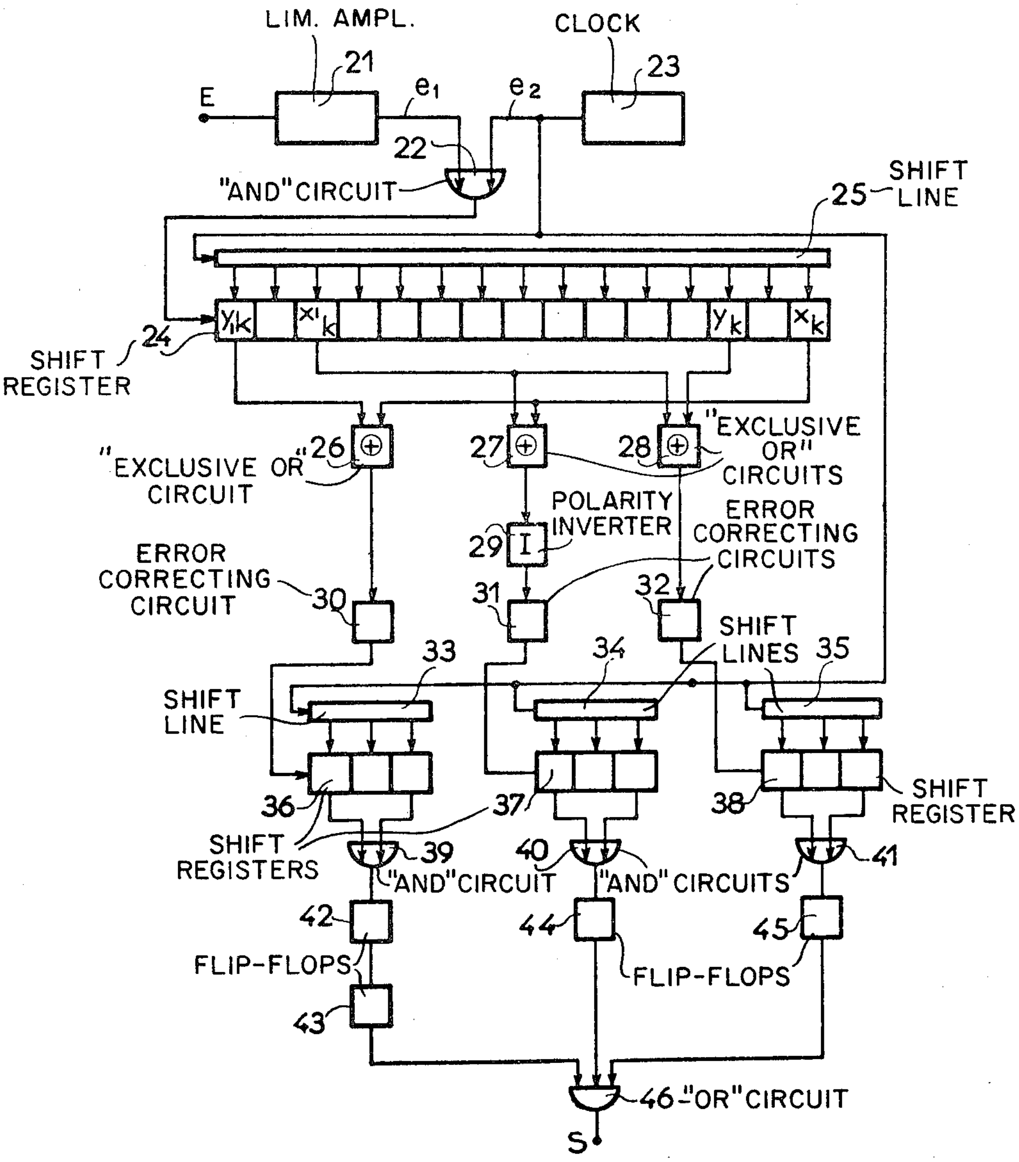

FIGURE 3 relates to the faults elimination process by majority decision in the case of FIGURE 2;

FIGURE 4 shows a theoretical waveshape of a quadrivalent differential phase modulation wave;

FIGURE 5 is a table illustrating the fault elimination process in the case of FIGURE 4; and FIGURE 6 shows an embodiment of the demodulation process of the invention in the case of a quadrivalent phase modulated wave.

I(a).—In FIGURE 1, (*a*) is a sequence of simple elementary signals of equal length T denoted by ZAAZ, where, in accordance with the terminology hereinabove referred to, A denotes the mark condition, corresponding conventionally to the binary digit 0, and Z the space condition corresponding conventionally to the binary digit 1. In order that the invention may be better understood, a value equal to 3 has been assumed for the ratio of the frequency of the carrier wave shown in (*b*) to the nominal signal frequency ½T; conventionally, the appearance of an A signal causes an inversion of the carrier phase, while the appearance of a Z signal does not affect the carrier phase. It has been assumed that the polarity of the received wave was sampled twelve times per signal of duration T, i.e., $n=12$.

Obviously, the numerical values of the parameters mentioned hereabove and hereafter are given only by way of example and these parameters may all be given different values without departing from the spirit and scope of the invention.

The analysis consists in comparing recurrently at $T/n$ time intervals, the polarities of pairs of samples, the two elements of which are respectively picked up at times $t$ and $t-T$ (the comparison could also be made between samples taken at the times $t$ and $t+T$); for instance, $x_1$ and $x'_1$; $x_2$ and $x'_2$ . . . $x_{12}$ and $x'_{12}$. As $x_1$ and $x'_1$ have the same polarity, the comparison will conventionally yield a "0" digit at the time $x'_1$; etc., and similarly for $x''_1$; etc. On the contrary, since $x''_1$ and $x'_1{}''$ have opposite polarities, the comparison yields a "1" digit at the time corresponding to $x'_1{}''$, etc.

In FIGURE 2, the wave received at point E is amplified and limited in the limiting amplifier 1. The output wave of the limiting amplifier 1 is fed to one input $e_1$ of a coincidence circuit ("AND" gate) 2 receiving at its other input $e_2$ pulses controlling the sampling, these pulses being delivered at regular intervals by a clock 3. 4 is a shift register with $(n+1)$ stages (i.e. 13 stages for $n=12$). The polarity samples are fed to the register 4 in the stage denoted by $x'_1$ and move up in the register under the effect of a shift line 5 which is fed with pulses from the clock 3 regularly recurring at time intervals equal to $T/n$.

The comparison between the state of the stage denoted in FIGURE 2 by $x'_k$ and the state of the $(n+1)$th stage $x_k$ is performed in a "modulo 2" binary adder 6, also called "exclusive OR" circuit, which carries out the following operation:

$$m_k=x_k\oplus x'_k=x_k\overline{x}'_k+\overline{x}_k x'_k$$

where the symbol $\oplus$ denotes the modulo 2 logical addition.

Figure 1:
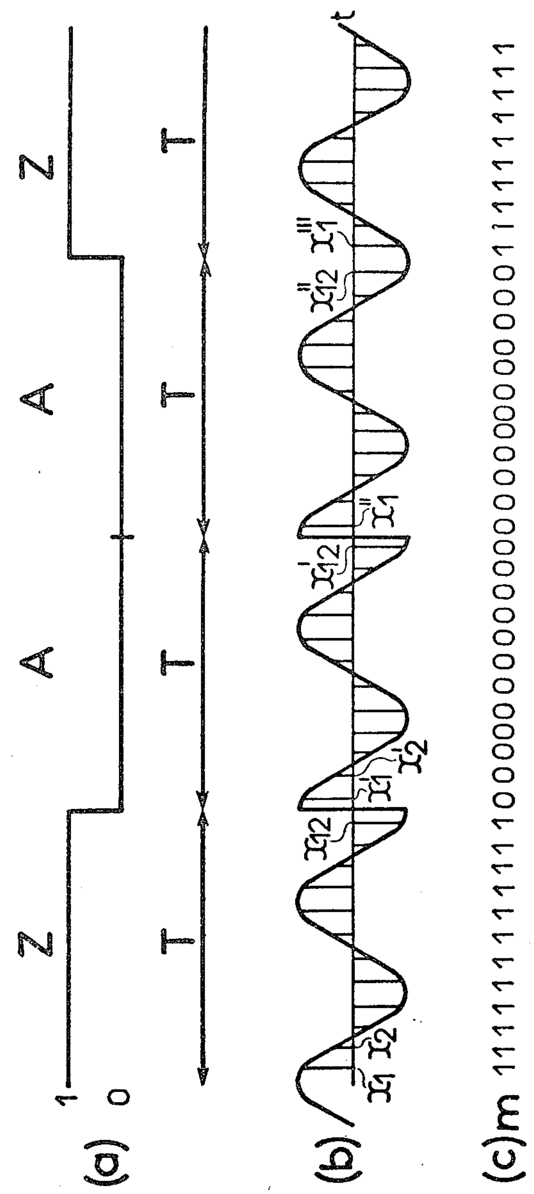
FIGURE 1 shows a theoretical waveshape of a bivalent differential phase modulation wave.

When there is no demodulation fault, the output of 6 delivers (FIGURE 1, line (*c*)) a monotonic sequence of 1's corresponding to a $Z=1$ signal, and a monotonic sequence of 0's corresponding to an $A=0$ signal. These sequences represent the originally transmitted Z and A signals.

In general, however, faults occur now and then. FIGURE 3 shows on line (*a*), by way of example, a sequence $m$ corresponding to the succession of a Z and an A, which is assumed to contain four faults in the Z element and five faults in the A element. Further elaboration is thus required, to obtain the originally transmitted signals. Line (*b*) shows a sequence $m'$ obtained from the previous sequence $m$ through a majority decision process performed as follows: the first three digits of the sequence $m$, i.e. (101) are compared together; as the majority of these digits is 1, the digit 1 is introduced in the sequence $m'$. The next group of three digits (010) yields by majority decision a 0 and this digit is introduced in the sequence $m'$; and so on. A similar process is applied to the part of the $m$ sequence which corresponds to the A signal. Finally, the line (*b*) of FIGURE 3, which is thus obtained, is a sequence $m'$ in which the number of faults has been greatly reduced.

The same process is applied again to the sequence $m'$ and a sequence $m''$ is obtained in line (*c*), wherein each part of the sequence corresponding to a single original signal is perfectly monotonic.

On another hand, individual signals may undergo a systematic distortion: as may be seen in sequence $m''$ of line (*c*), the length of the series of "1" digits corresponding to the Z signal has been increased by one elementary time unit $T/12$, that corresponding to the A signal has been reduced by the same amount. Such a distortion, however, is small and cannot seriously disturb telegraph or similar signal transmission.

In Boolean algebra, a majority decision process can be performed as follows:

If $m_1$, $m_2$, $m_3$ are three successive samples each having either of the 0 and 1 values, the value $m'$, which is substituted by majority decision for the whole of $m_1$, $m_2$, $m_3$, is given by the logical equation:

$$m'=m_1m_2+m_2m_3+m_3m_1$$

The assembly inside frame I in FIGURE 2 shows an arrangement which performs the corresponding operations: the elements $m$ are fed into a three-stage shift register 8, the shift line 7 of which is controlled by by pulses recurring at $T/n$ internals delivered by the clock 3 via a connection 11. The logical products of any two of the three quantities $m_1$, $m_2$, $m_3$ are performed in the three "AND" circuits shown as 9; the "OR" circuit 10 delivers a digit of value $m'$ at its output.

The assembly inside frame II contains the same components as assembly inside frame I and performs on the $m'$ digits fed to its input the same corrections as were performed on the $m$ digits by the assembly I. Its output S delivers the desired demodulated and corrected telegraph as similar binary signal.

Obviously, all the numerical values indicated in the preceding description have been chosen only by way of example.

In particular, it was assumed in the previous example that there were not two consecutive faults. When this is not the case, the majority decision correction may be performed by using five successive samples and associating them in three's; to perform the logical products between five quantities taken by three's, ten "AND" circuits are required, this being the number of combinations between five quantities taken three by three.

I(b).—The application of the above-described demodulation arrangement to frequency modulation is made possible by the fact that a frequency modulation bivalent system is only little different from a differential phase modulation system when the duration of the elementary signals is of the same order of magnitude as the period of the carrier wave. This is obvious as, if one observes the changes in the value of the carrier wave phase between two instants separated by a time interval T equal to the duration of an elementary signal, one finds in the case of the differential phase modulation system phase jump and, in the case of frequency shift keying, one also finds a change when the frequency has been varied.

For a non-limitative but particularly important example, that of the 1,200-baud system provisionally recommended by the CCITT, the main parameters have the following values:

middle frequency $f_0=1{,}700$ c.p.s., Z signal
characteristic frequency $f_1=1{,}300$ c.p.s., A signal
characteristic frequency $f_2=2{,}100$ c.p.s.

After a time interval T equal to the duration of an elementary signal, the following phase variation is obtained.

For Z:

$$\delta\phi = 2\pi f_1 T = 2\pi \cdot 1300 \cdot T = 2\pi f_4 T - g$$

For A:

$$\delta_2 = 2\pi f_2 T = 2\pi \cdot 100 \cdot T = 2\pi f_4 T + g$$

$g$ being the modulation index, all phase angles being expressed in radians.

It results that:

$$g = \frac{2\pi}{3}$$

$$2\pi f_0 T = 3\pi - \frac{\pi}{6}$$

with $T = 1/1200$ (telegraph transmission speed=1200 bauds).

This gives $$\delta\phi_1 = 2\pi + \frac{\pi}{6}$$

$$\delta_2\phi = 4\pi + \frac{\pi}{2}$$

If two samples taken at $T/2$ intervals are compared, the measured phase differences are half the preceeding ones:

For A—

$$\frac{\delta\phi}{2} 1 = \pi + \frac{\pi}{12}$$

For Z—

$$\frac{\delta\phi}{2} 2 = 2\pi + \frac{\pi}{4}$$

These phase differences are close respectively to $\pi$ and $2\pi$. It results therefrom that the comparison of the polarities of two samples separated by a time $T/2$, so-called $x_k$ and $z_k$, assumed to be respectively applied to two inputs of an "exclusive OR" circuit, will yield:

For A—

$$x_k \oplus z_k = 1$$

For Z—

$$x_k \oplus z_k = 0$$

In the case of the lower frequency (1300 c.p.s.), the error resulting from the shift $\pi/12$ will generally be lower than that resulting from the phase distortion through the line between the transmitting and receiving ends of the system, since the shift of the zeros of the carrier resulting from this latter cause may well be larger than $\pi/12$ radians.

For the higher frequency (2100 c.p.s.), it may be seen that, with twelve samples spread over the range $(4\pi - \pi/12)$ radians, referred to the latter frequency, modulo 2 comparisons performed every six samples may lead to three faults over a duration T, appearing as isolated "1's" in a sequence of several "0's." These faults are easily corrected by means of the majority decision register.

Consequently, the demodulator proposed for the demodulation of differential phase bivalent modulation can be, without noticeable modification, applied to the frequency demodulation 1200-baud technique described above.

For this purpose, in the diagram of FIGURE 2, it suffices to use only one-half of the register 4, i.e. to move the switch 12 from the position 13 to the position 14. The rest of the equipment may be kept unaltered.

It is obvious that the values of the parameters quoted above are given only by way of example. The invention applies to the reception of any frequency modulation coded transmission, in which the duration of the elementary signal T is of the same order of magnitude as the period of the carrier current and for which it is possible to select a simple fraction $b/n$ smaller than unity of the time duration T such that, if the polarities of two samples separated by a time $bT/n$ are compared, there is a high probability that the polarity will be reversed for one of the two values of the elementary signal, and that it will not be reversed for the other value.

This is all the more true that, in most practical cases, all concerned frequencies are related to $1/T$ in a very simple manner.

II.—In the quadrivalent system, the successive coded signals are grouped in pairs or dibits, the elements of which are conventionally called U and V; to each pair corresponds a phase shift $\delta\phi$ with one of the values, 0, $\pi/2$, $\pi$ and $3\pi/2$ radians. The following correspondence table may be used:

| U | V | $\delta\phi$ |
|---|---|---|
| A | A | $\pi$ |
| A | Z | $\pi/2$ |
| Z | A | $3/\pi/2$ |
| Z | Z | 0 |

where $\delta\phi$ designates the phase shift for the corresponding (U, V) combination.

By way of example, a carrier wave frequency may be selected such that the duration T of a signal pair extends over three half-periods of this carrier; this could enable, for instance, a signalling speed of 2400 bauds with a carrier frequency of 1800 c.p.s. and a total bandwidth of 1200 c.p.s. It is evident that these values are intended only for illustrating the description and that they may be modified without departing from the spirit and scope of the invention.

Like in the case of the bivalent system, demodulation is performed through sampling and polarity comparisons of the samples.

Conventionally, the positive polarity samples are hereunder given the binary value 1, and the negative polarity samples the value 0. The sampling rhythm is taken equal to $f = 4\,sf_0$, where $f_0$ is the carrier wave frequency and $s$ is any small integer, $T_1$ being the time interval between two samplings ($T_1 = 1/f$) $T_0$ the carrier period ($T_0 = 1/f_0$); a value $s=2$ leads to the number of samplings per elementary signal $n=12$; a value $s=3$ lead to $n=18$. Of course, $nT_1$ is substantially equal to T.

In FIGURE 4(*a*) is shown, by way of example, a sequence of coded signals grouped in four different pairs. It will now be assumed that $n=12$.

FIGURE 4(*b*) shows, for the selected values of the parameters, the phase reversals of the carrier corresponding to the respective pairs as well as the location and polarity of the samples. The following symbols have been adopted:

$x_k$=binary value of a sample picked up at time $t_k$
$x'_k$=binary value of a sample picked up at time $t'_k = t_k + T$ (or possibly at $t_k - T$)
$y_k$=binary value of a sample picked up at time $t_k + T_0/4$, i.e., in the case above, at $t_k + T/6$
$y'_k$=binary value of a sample picked up at $t_k + T/6 + T$.

Denoting, as done usually, the "modulo 2" addition by the symbol $\oplus$, the quantities used for the demodulation are as follows:

$$w_k = x_k \oplus x'_k$$
$$p_k = y_k \oplus x'_k$$
$$q_k = x_k \oplus y'_k$$

It is seen in FIGURE 4(*b*) that the $w$ samples are spaced by 12 $T_1$ time intervals, the $p$ samples by 10 $T_1$ time intervals, the $q$ samples by 14 $T_1$ time intervals. In FIGURE 4, the 12 $T_1$, 10 $T_1$ and 14 $T_1$ intervals have been respectively designated as $W_1$, $P_1$ and $Q_1$.

To the instantaneous polarity of the wave at time $t$, denoted by $w$, is associated $w'$, which is the value of $w$ at time $t+2T$. Quantities $p'$ and $q'$ may similarly be obtained from $p$ and $q$ may be obtained by a time shift equal to $2T_1$.

On the basis of the quantities defined above, the demodulation technique consists in elaborating the values $\overline{w}$, $p'$, $q'$ from the values of $\overline{w}$, $p$, $q$, and in performing the following logical products:

$$\overline{ww}', \; pp', \; qq'$$

where $\overline{w}$ and $\overline{w}'$ are the complementary quantities to $w$ and $w'$ in the sense of Boolean algebra.

A justification of this method may be found in examining the table of FIGURE 5, in which, by way of example are reported the quantities $w$, $\overline{w}$, $\overline{w}'$ and $\overline{ww}'$ in front of each sample, for each of the four pairs, the quantity $\overline{w}'$ being obtained by a two-rank shift $\overline{w}$ to the left of $\overline{w}$. It may be seen, through examining of this table, that $\overline{ww}'$ is everywhere zero, except for the pair AA. Similarly, it might be shown that $qq'$ is everywhere zero except for the pair ZA and that $pp'$ is, except for a short series "11" at the end of the ZZ pair, everywhere zero, except for the pair AZ.

It results therefrom that a "1" value for the product $\overline{ww}'$ denotes the AA pair, a "1" value for the $qq'$ product denotes the ZA pair, and that a "1" value for $pp'$ denotes the AZ pair. The simultaneous zero condition for all of the three products denotes the ZZ pair.

It may be deduced that the two elements of any UV pair may be separately obtained on two respective outputs through the following logical operations:

$$U=\overline{ww}'+pp'$$

$$V=\overline{ww}'+qq'$$

which do give respectively $U=A$ for $\overline{ww}'=1$ or $pp'=1$ and $V=A$ for $\overline{ww}'=1$ or $qq'=1$. The AZ and ZA pairs are obtained in a similar manner.

In the above-given example, U will take the successive values ZAZ and V the successive values ZAA, each value being characterized by a large number of identical successive digits, this number varying in fact between 10 and 14, depending on the pairs adjacent to the pair under consideration. This duration variation leads to a signal distortion and not to a fault.

Each of the pairs UV may also be sequentially obtained from the quantities $\overline{ww}'$, $pp'$, $qq'$ at a single output, as will be shown hereunder.

The otherwise unavoidable sampling errors are corrected through the "majority decision" technique described above with reference to the demodulation of bivalent differential phase modulation. As in the preceding case, this technique is indispensable in order to obtain a satisfactory performance.

A quadrivalent differential phase demodulator is shown in FIGURE 6. The carrier wave is applied to the terminal E of the limiting amplifier 21. Samplings are made by the "AND" gate 22 which is also fed by the local clock 23, which produces pulses spaced by time intervals equal to $T/12$ (T being the duration of an elementary signal belonging to a pair), or also approximately equal to $\frac{1}{8} f_0$. The samples picked up by the gate 22 are fed into a shift register 24, where they move on under the action of the shift line 25 which is fed by control pulses also recurring at $T/12$ time intervals from the clock 23. The quantities $q$, $w$, $p$ are respectively elaborated in the "modulo 2" (or "exclusive OR") circuits, 26, 27, 28. The polarity inverter circuit 29 elaborates the complementary quantity $\overline{w}$ to the quantity $w$ fed to its input.

The occasional errors affecting the quantities $q$, $\overline{w}$ and $p$ are eliminated by the majority decision registers 30, 31, 32, each of which is exactly identical to the assembly shown in I in FIGURE 2.

The shift registers 36, 37, 38, each of which is provided with a shift line, 33, 34, 35 respectively, and which are associated with the AND circuits 39, 40, 41 respectively elaborate the quantities $qq'$, $\overline{ww}'$, and $pp'$).

These quantities are fed to the monostable flip-flops 42, 43, 44 and 45, the function of which is as follows:

For $qq'=1$, the flip-flop 42 delivers a rectangular signal of duration $T/2$, followed by another one of duration $T/2$ delivered by the flip-flop 43, the latter being fed to the input of an "OR" circuit 46: the signal shape corresponding to the pair ZA in FIGURE 4 is actually obtained. For $\overline{ww}'=1$, the flip-flop 44 delivers a rectangular signal of duration T, this being indeed the shape corresponding to the pair AA in FIGURE 4. For $pp'=1$, the flip-flop 45 delivers a rectangular signal of duration $T/2$, this being indeed the shape corresponding to the pair AZ as shown in FIGURE 4. The demodulated telegraph on similar coded signals are thus delivered sequentially at the ouput S of the "OR" circuit 46.

It must, of course, be understood that all the numerical values quoted above are given only by way of example and that they do not imply any limitation of the scope of the invention.

What I claim is:

1. A demodulator for a received carrier wave having at any instant either of two opposite polarities and modulated by binary coded signals of constant duration T according to either of the methods known as bivalent differential phase modulation and frequency shift modulation, comprising, a clock pulse source delivering recurrent control pulses at time intervals $T_1$ substantially equal to $T/n$, $n$ being an integer number, sampling means having a wave input, a control input and an output, input circuit means for applying said received wave to said wave input of said sampling means, and means for applying said control pulses from said clock pulse source to said control input of said sampling means, a main shift register including a plurality of stages, a shift line, a series input and a plurality of parallel outputs each corresponding to a different one of said stages, a connection for applying said control pulses from said source to said shift line, and further circuit means for connecting said output of said sampling means to said series input of said main register, an "exclusive OR" circuit having two inputs respectively fed from two of said parallel outputs of said main register and an output, and a linking circuit connecting latter said output to a working circuit for demodulated signals; said linking circuit comprising at least one error correcting circuit itself comprising:

an auxiliary shift register having an odd number of stages at least equal to 3 and smaller than $$\left(\frac{n}{2}+1\right)$$

said auxiliary register including a shift line, a series input and a plurality of parallel outputs each corresponding to one of latter said stages, means for applying control pulses from said clock pulse source to latter said shift line, an input terminal connected with said series input of said auxiliary register, a plurality of "AND" circuits each having two inputs and an output and in number equal to that of the two by two permutation combinations of said parallel outputs of said auxiliary register, connections respectively connecting the two inputs of each said "AND" circuit to two of latter said parallel outputs according to one different of said permutation combinations, and an "OR" circuit having an output and a plurality of inputs in number equal to that of the outputs of said "AND" circuits and each connected to one different of latter said outputs, and an output terminal connected with said output of said "OR" circuit.

2. A demodulator as claimed in claim 1, in which said linking circuit includes a plurality of cascade-connected error correcting circuits substantially identical with above-said error correcting circuit.

3. A demodulator as claimed in claim 1, in which said input circuit means include a limiting amplifier.

4. A demodulator as claimed in claim 1, in which said sampling means consist of an "AND" gate.

5. A demodulator as claimed in claim 1, adapted to the demodulation of a bivalent differential phase modulated wave, in which said main register includes at least $(n+1)$ stages.

6. A demodulator as claimed in claim 1, adapted to the demodulation of a frequency shift modulated wave, in which said main register includes at least $$\left(\frac{n}{2}+1\right)$$

stages.

7. A demodulator for a received carrier wave having at any instant either of two opposite polarities and modulated by binary coded signals of constant duration T according to the method known as quadrivalent differential phase modulation, comprising, a clock pulse source delivering recurrent control pulses at time intervals $T_1$ substantially equal to $T/n$, $n$ being an integer number, sampling means having a wave input, a control input and an output, input circuit means for applying said received wave to said wave input of said sampling means, and means for applying said control pulses from said clock pulse source to said control input of said sampling means, a main shift register including a plurality of stages in number exceeding the sum of $(n+1)$ and a fixed integer number, a shift line, a series input and a plurality of parallel outputs each corresponding to one different of said stages, a connection for applying said control pulses from said source to said shift line, and further circuit means for connecting said output of said sampling means to said series input of said main register, three "exclusive OR" circuits each having an output and two inputs respectively fed from two of said parallel outputs of said main register respectively corresponding to two stages of said register the ranks of which differ by one corresponding of three different further integer numbers, and three linking circuits respectively connecting said outputs of said "exclusive OR" circuits to three inputs of a combination circuit; at least part of said linking circuits comprising at least one error correcting circuit itself comprising:

an auxiliary shift register having an odd number of stages at least equal to 3 and smaller than $$\left(\frac{n}{2}+1\right)$$

said auxiliary register including a shift line, a series input and a plurality of parallel outputs each corresponding to one of latter said stages, means for applying control pulses from said clock pulse source to latter said shift line, an input terminal connected with said series input of said auxiliary register, a plurality of "AND" circuits each having two inputs and an output and in number equal to that of the two by two permutation combinations of said parallel outputs of said auxiliary register, connections respectively connecting the two inputs of each said "AND" circuit to two of latter said parallel outputs according to one different of said permutation combinations, and an "OR" circuit having an output and a plurality of inputs in number equal to that of the outputs of said "AND" circuits and each connected to one different of latter said outputs, and an output terminal connected with said output of said "OR" circuit;

said combination circuit comprising three timing circuits each having an input fed from the output of a corresponding one of said first-named three "exclusive OR" circuits and recurrently and simultaneously delivering at two distinct outputs pairs of signals, the two elements of which are respectively identical with one and the other of two signals successively received from said corresponding one of said linking circuits at times differing by the product of $T_1$ by above-said fixed integer number; said combination circuit further comprising means for translating said signals delivered at said two distinct outputs into binary signals each having either of the 0 and 1 values and means for effecting the logical product of each pair of such binary signals, means for additively combining said logical products into pairs of demodulated binary signals and for delivering the latter signals to a final output terminal for demodulated signals.

8. A demodulator as claimed in claim 7, in which at least part of said linking circuits includes a plurality of cascade-connected error correcting circuits substantially identical with above-said error correcting circuit.

9. A demodulator as claimed in claim 7, in which said input circuit means include a limiting amplifier.

10. A demodulator as claimed in claim 7, in which said sampling means consist of an "AND" gate.

11. A demodulator as claimed in claim 7, in which each one of said timing circuits comprises a further shift register having a number of stages at least equal to above-said fixed number plus one, said further register having a shift line fed from control pulses from said clock pulse source, and said two distinct outputs corresponding to two stages in said further register, the respective ranks of which differ by said fixed number.

12. A demodulator as claimed in claim 1, in which one of said linking circuits includes a polarity inverter.

13. A demodulator as claimed in claim 7, in which said combination circuit includes three monostable flip-flops respectively connected by their inputs to the outputs of three "AND" circuits, and in which the three outputs of said monostable flip-flops are respectively connected to three inputs of a common "OR" circuit, the output of which delivers demodulated pairs of time-staggered binary signals.

14. A demodulator as claimed in claim 7, adapted to the case in which said received wave is phase-modulated at any instant according to one of four phases substantially and respectively equal to 0, $\pi/2$, $\pi$ and $3\pi/2$ radians, and in which said three further integer numbers are respectively equal to $n$, $$\left(n+\frac{n}{2k}\right)$$

and $$\left(n-\frac{n}{2k}\right)$$

where $k$ is the number of half-periods of the carrier wave in duration T and where $n$ is an integer multiple of $2k$.

15. A demodulator for a received carrier wave having at any instant either of two opposite polarities and modulated by coded signals of constant duration according to either of the methods known as differential phase modulation and frequency modulation, comprising sampling means for sampling said wave for its polarity at recurring instants spaced by a time interval much smaller than said duration, storage means for storing a plurality of samples from said sampling means for a predetermined time, said samples respectively corresponding to successive one of said recurring instants, logic circuit means for recurrently comparing at further instants spaced by same-said time interval the polarity of the last stored sample with those of at least one formerly stored sample and for translating the result of such comparisons into corresponding binary digits of either of two values, further storage means for storing a plurality of said binary digits, further logic circuit means for comparing the values of an odd number of consecutive ones of said stored digits and deriving a further binary digit having either of said values depending on the value of the majority of digits in said odd number of stored digits, still further logic circuit means for repeatedly effecting further odd number majority comparison on said further digits and on still further digits derived therefrom, and means for translating final digits obtained from the last of said comparisons into demodulated signals.

16. A demodulator as claimed in claim 15, adapted to bivalent differential phase modulation and frequency modulation, in which said demodulated signals are directly obtained from said final digits.

17. A demodulator as claimed in claim 15, adapted to multivalent differential phase modulation, in which said demodulated signals are obtained by forming products of pairs of said final digits and adding of said products.

References Cited

UNITED STATES PATENTS

| | | | |
|---|---|---|---|
| 3,128,343 | 4/1964 | Baker | 178—66 X |
| 3,330,909 | 7/1967 | Wilson | 325—30 X |

ROBERT L. GRIFFIN, Primary Examiner

WILLIAM S. FROMMER, Assistant Examiner

U.S. Cl. X.R.

178—66; 325—320